July 24, 1928.
N. SULENTIC
SPRING RECOMPRESSOR
Filed Aug. 15, 1927
1,677,934
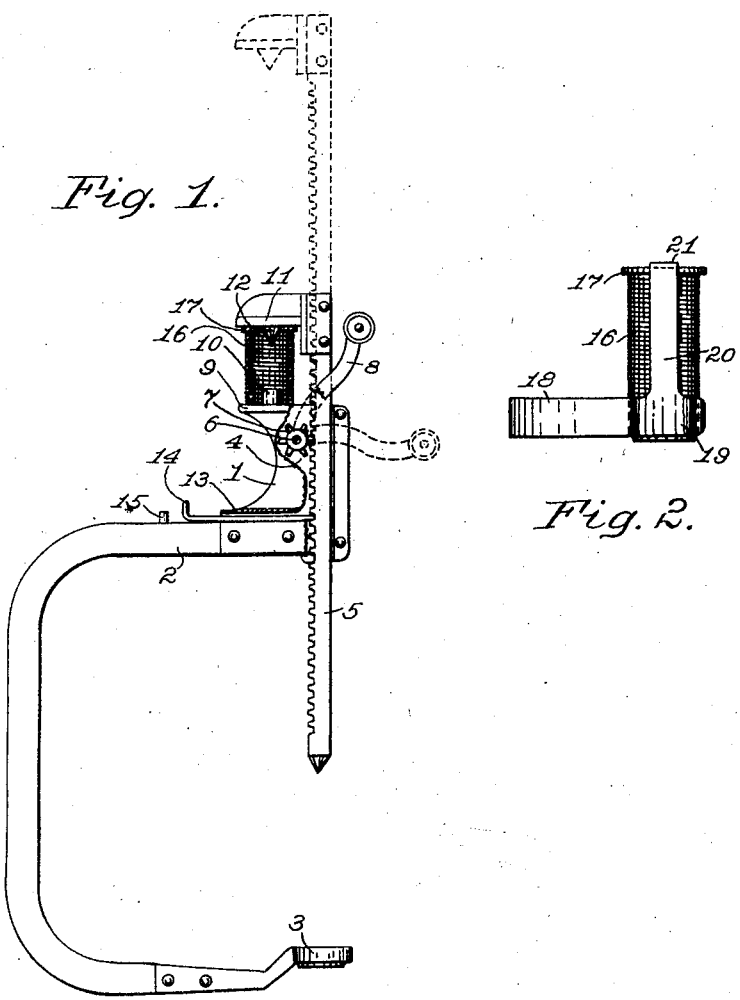
Inventor
Nicholas Sulentic
Attorney Patented July 24, 1928.

1,677,934

UNITED STATES PATENT OFFICE.

NICHOLAS SULENTIC, OF WATERLOO, IOWA.

SPRING RECOMPRESSOR.

Application filed August 15, 1927. Serial No. 213,068.

My invention relates to improvements in spring recompressors, and the object of my improvement is to provide a device for recompressing coiled compression springs after their primary compression and subsequent release and reactive extension, whereby such springs may be remounted upon valve-stems after removal therefrom.

This object I have accomplished by the means which are hereinafter described and claimed, and which are illustrated in the accompanying drawings, in which Fig. 1 as a side elevation showing in the same device as connected therein, a spring compressor and a spring re-compressor, the latter embodying the present invention, the former with its operating elements having been protected previously by my Patent No. 1,598,754, dated September 7, 1926. Fig. 2 is a side elevation, on a larger scale of the compressed spring shown in elevation in said Fig. 1, as removed from said recompressor and as held in a compressed state in a spring-holder such as is shown in my previous application for patent Serial No. 670,810, filed October 26, 1923, and patented October 19, 1926, No. 1,603,818, this being carved out of said application and filed after the grant of the patent.

The primary spring compressor so associated with my said spring re-compressor comprises a U-shaped frame 2 having spring furcations 3 terminating its lower arm and opposed to a valve-engaging rack-bar 5 mounted slidably in a bearing hollow 4 of a rigid body member 1 fixed on the upper arm of said U-shaped frame. In said bearing hollow is also mounted a pinion 7 in mesh with said rack-bar and fixed on a shaft 6 rotatable in bearing openings in the member 1 and carrying a hand-crank 8. Said body member 1 also has an apertured bearing seat 13 containing a slide pawl 14 to engage roots of teeth on said rack-bar, a stop pin 15 therefor being fixed in the upper arm of the U-shaped frame 2.

The upper part of the body member 1 is shaped with an integral jaw 9 having a short upwardly projecting cylindrical boss 10 thereon. Upon the upper end of the rack-bar 5 is fixed a coacting jaw 11 having a depending conical boss 12 thereon which is above and in alinement with the lower boss 9.

The dotted lines in Fig. 1 show the positions of the hand-crank 8 and the rack-bar 5 when the latter is extended.

A coiled compression spring 16, having as above mentioned been previously compressed about a valve-stem while the stop pin therein is being removed, and then allowed to extend, may in its extended shape be positioned between the narrower jaws 11 and 9 to be re-compressed between them to then be transported by the spring holder shown in Fig. 2 to and to be remounted on the valve-stem aforesaid before the stop pin is reseated therein.

In mounting the uncompressed spring 16 together with its top washer 17 between said jaws 11 and 7, the lower end of the spring is seated concentrically around the cylindrical boss 10. When the crank-arm 8 is rotated appropriately to cause the rack-bar 5 to move downwardly, the upper jaw 11 engages the washer 17 while the conic boss 12 enters the open upper end of the spring centrally so that the spring is held squarely between said jaws while being compressed. When so compressed, the slide pawl 14 is moved to engage the rack-bar, holding the compressed spring securely.

Any suitable spring holder or clip may be used with which to receive and remove the compressed spring from between the jaws 11 and 9, and the spring holder of said Fig. 2 may be so used. This holder comprises a spring bar 18 bent into a loop with inwardly concaved furcations 19 to clasp the wardly concaved furcations 19 to clasp the lower end of the compressed spring 16 while inwardly turned terminations 21 on flat standards 20 on the furcations engage the top of the associated washer 17 and spring 16. When the spring is so clipped, the crank-arm 8 may be rotated to release the upper jaw 11, so that the holder 18 may be used to remove the spring from the lower jaw 9 and its boss 10.

Having described my invention, what I claim as new, and desire to secure by Letters Patent, is:

1. A spring re-compressor, comprising rigid spring engaging and clamping jaws connected to be moved to and from each other, one jaw having an upwardly projecting cylindrical boss, and the other jaw having a depending conical boss vertically alined centrally with said cylindrical boss, and said jaws being narrower than a coiled compression spring mounted between them around said bosses.

2. A spring re-compressor, comprising rigid spring engaging and clamping jaws connected to be moved to and from each other, one jaw having an upwardly projecting cylindrical boss to fit centrally within the lower end of a coiled compression spring mounted between the jaws, the other jaw having a depending conical boss positioned in vertical alinement above and with said cylindrical boss to enter and center the upper end of said spring and an annular washer superposed thereon, and means for releasably locking said jaws in adjusted relative positions.

In testimony whereof I affix my signature.

NICHOLAS SULENTIC.